(12) United States Patent
Chung et al.

(10) Patent No.: US 8,350,827 B2
(45) Date of Patent: Jan. 8, 2013

(54) DISPLAY WITH INFRARED BACKLIGHT SOURCE AND MULTI-TOUCH SENSING FUNCTION

(75) Inventors: In Jae Chung, Gyeonggi-do (KR); In Ho Ahn, Gyeonggi-do (KR); Sang Hyuck Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1561 days.

(21) Appl. No.: 11/888,143

(22) Filed: Jul. 31, 2007

(65) Prior Publication Data
US 2008/0074401 A1 Mar. 27, 2008

(30) Foreign Application Priority Data

Sep. 26, 2006 (KR) .......................... 10-2006-093712

(51) Int. Cl.
*G06F 3/042* (2006.01)
(52) U.S. Cl. ........... 345/175; 345/173; 345/92; 345/102
(58) Field of Classification Search .................. 345/87, 345/92, 102, 173, 175, 207; 178/18.01, 18.09
See application file for complete search history.

(56) References Cited

U.S. PATENT DOCUMENTS

| 4,484,179 | A | * | 11/1984 | Kasday | 345/176 |
|---|---|---|---|---|---|
| 5,105,186 | A | * | 4/1992 | May | 345/175 |
| 5,389,951 | A | * | 2/1995 | Baker | 345/174 |
| 6,809,726 | B2 | * | 10/2004 | Kavanagh | 345/173 |
| 7,009,663 | B2 | * | 3/2006 | Abileah et al. | 349/12 |
| 7,432,893 | B2 | * | 10/2008 | Ma et al. | 345/87 |
| 7,465,914 | B2 | * | 12/2008 | Eliasson et al. | 250/221 |
| 7,825,998 | B2 | * | 11/2010 | Chen et al. | 349/12 |
| 7,924,272 | B2 | * | 4/2011 | Boer et al. | 345/175 |
| 8,102,378 | B2 | * | 1/2012 | Chung et al. | 345/173 |
| 2003/0156100 | A1 | | 8/2003 | Gettemy | |

(Continued)

FOREIGN PATENT DOCUMENTS
DE 2936815 4/1981
(Continued)

OTHER PUBLICATIONS

Office Action issued in corresponding German Patent Application No. 10 2007 034 772.5; issued May 25, 2009.

(Continued)

*Primary Examiner* — Joe H Cheng
(74) *Attorney, Agent, or Firm* — Brinks Hofer Gilson & Lione

(57) ABSTRACT

A touch-sensing display screen includes an upper transparent substrate, a lower substrate opposite the upper substrate, and a backlight unit having an infrared light source configured to radiate infrared light through the upper substrate in a first direction. A transparent window is disposed in alignment with the infrared light source and between the upper and lower transparent substrates. A portion of the infrared light radiated in the first direction is reflected back through the upper substrate and through the transparent window in a second direction by an object touching a surface of the upper transparent substrate. A pixel thin-film transistor on the lower substrate is configured to activate a pixel electrode, and an infrared light-sensing thin-film transistor is configured to sense the infrared light received through the upper substrate in the second direction, and output an infrared light-sense signal in response thereto.

21 Claims, 14 Drawing Sheets

U.S. PATENT DOCUMENTS

| | | |
|---|---|---|
| 2004/0051140 A1 | 3/2004 | Bhattacharyya |
| 2004/0217945 A1* | 11/2004 | Miyamoto et al. ............ 345/173 |
| 2005/0093851 A1 | 5/2005 | Nakamura |
| 2006/0097991 A1 | 5/2006 | Hotelling et al. |
| 2008/0122792 A1* | 5/2008 | Izadi et al. .................... 345/173 |

FOREIGN PATENT DOCUMENTS

| | | |
|---|---|---|
| JP | 2003-262850 | 1/2003 |
| WO | WO 03/071345 A1 | 8/2003 |
| WO | 2005/057921 | 6/2005 |

OTHER PUBLICATIONS

Office Action issued in corresponding German Patent Application No. 10 2007 034 772.5-53; mailed Nov. 3, 2008.

* cited by examiner

DISPLAY WITH INFRARED BACKLIGHT SOURCE AND MULTI-TOUCH SENSING FUNCTION

This application claims the benefit of Korean Patent Application No. P2006-093712 filed on Sep. 26, 2006, which is hereby incorporated by reference.

BACKGROUND

1. Field of the Invention

The present invention relates to a display, and more particularly to a display that is capable of multi-touch sensing, and a driving method thereof.

2. Description of the Related Art

Generally, a touch panel is a type of user interface that may be attached to a surface of a display device, where an electrical characteristic is changed at a touch area where a finger of the user or other instrument contacts the touch panel so as to sense the touch area thereof. The application for touch panels extend to small portable terminals, office equipment and the like. If two or more touches are simultaneously generated, the touch panel might malfunction or any one of the touches may be selected by a pre-set program.

FIGS. 1-3 show known multi-touch devices that have attempted to overcome the limitations of multi-touch recognition systems. Referring to FIG. 1, the multi-touch device of the related art includes a transparent acrylic plate 11 and first through fourth IR (infrared) arrays 12A-12D. IR arrays 12A-12D include infrared light emitting diodes (IRLED), and IR photo detectors (IRPD). FIG. 2 shows that a hand of the user or a pen is directly in contact with the transparent acrylic plate 11.

The first through fourth IR arrays 12A-12D are arranged to face a side surface of the transparent acrylic plate 11. Infrared light is radiated from the IRLEDs 13 through the transparent acrylic plate 11. The infrared light is received by the corresponding IRPDs 14. In this state, if a finger of the user or a pen is in contact with the transparent acrylic plate 11, the infrared light is scattered and is not received at the corresponding IRPD 14. Accordingly, the multi-touch device in FIG. 1 may recognize an erroneous touch location.

A multi-touch device of the related art in FIG. 1 includes the IR arrays 12A-12D arranged at a side surface of the transparent acrylic plate 11, and is advantageous because it is thin. However, the multi-touch device of the related art is disadvantageous because the multi-touch recognition capability is inaccurate due to a direct illumination by infrared light. Further, the effective display surface is reduced by an area occupied by the IR arrays 12A-12D. FIG. 2 and FIG. 3 show a projector-type multi-touch device. The multi-touch device includes a camera and projector module 30, which are located a rear portion of the transparent acrylic plate 11.

If a hand of the user is in contact with an arbitrary point on the transparent acrylic plate 11, an infrared ray is scattered by the hand. The scattered infrared ray is incident on the camera and projector module 30. Such a scattered infrared ray SIR is sensed by the camera and projector module 30. Because the distance between the transparent acrylic plate 11 and the camera and projector module 30 is relatively long, the multi-touch device in FIG. 2 and FIG. 3 occupies a wide space. Furthermore, since the multi-touch device in FIG. 2 and FIG. 3 displays an image using a projector, the type of display device and the design of the display device is limited. Additionally, the life span of a the projection lens is limited.

Furthermore, the multi-touch devices in FIG. 2 and FIG. 3 transmit signals from the camera and projector module 30 to an external computer via a cable, and process the signals by the external computer. Thus, the system is complicated, the space occupied by the components is large, and a signal transmitting path is long.

SUMMARY

A touch-sensing display screen is disclosed that includes an upper transparent substrate, a lower substrate opposite the upper substrate, and a backlight unit having an infrared light source configured to radiate infrared light through the upper substrate in a first direction. A transparent window is disposed in alignment with the infrared light source and between the upper and lower transparent substrates. A portion of the infrared light radiated in the first direction is reflected back through the upper substrate and through the transparent window in a second direction by an object touching a surface of the upper transparent substrate. A pixel thin-film transistor on the lower substrate is configured to activate a pixel electrode, and an infrared light-sensing thin-film transistor is configured to sense the infrared light received through the upper substrate in the second direction, and output an infrared light-sense signal in response thereto.

BRIEF DESCRIPTION OF THE DRAWINGS

The invention will be apparent from the following detailed description of the embodiments of the present invention with reference to the accompanying drawings, in which.

DETAILED DESCRIPTION

Figure 1:
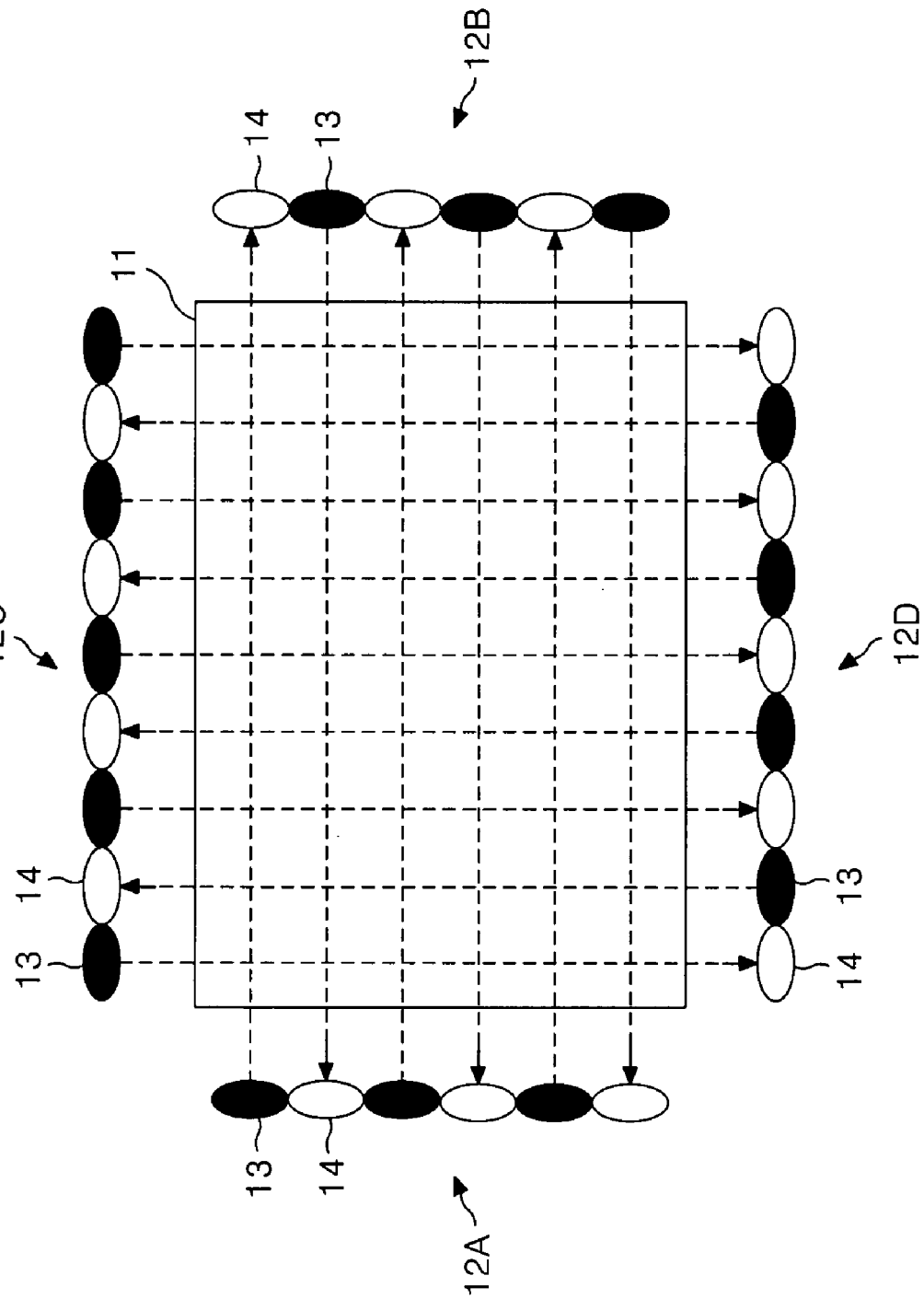
FIG. 1 is a plan view schematically showing a multi-touch device of the related art.
Figure 2:
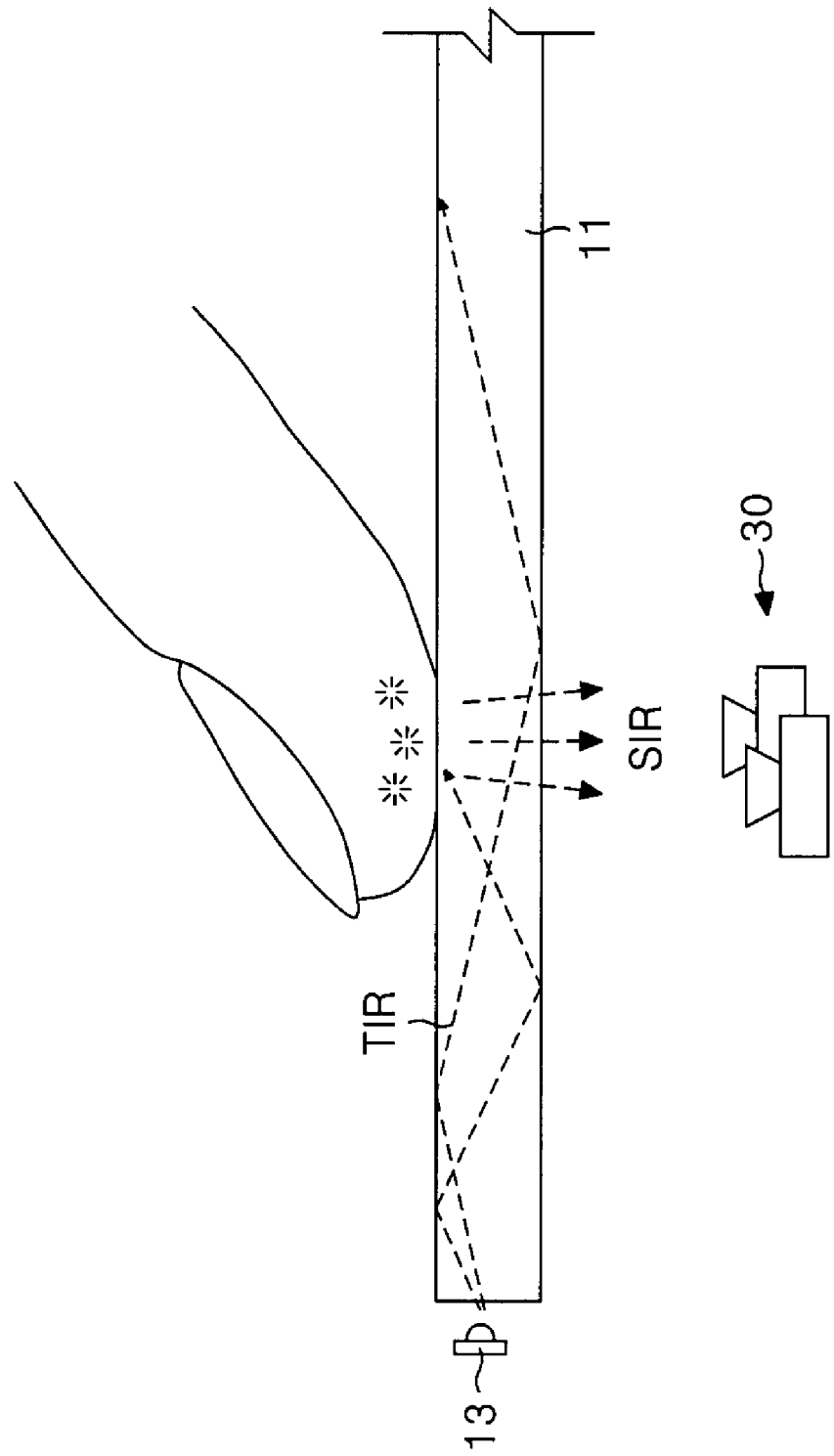
FIG. 2 and FIG. 3 show related multi-touch devices.
Figure 3:
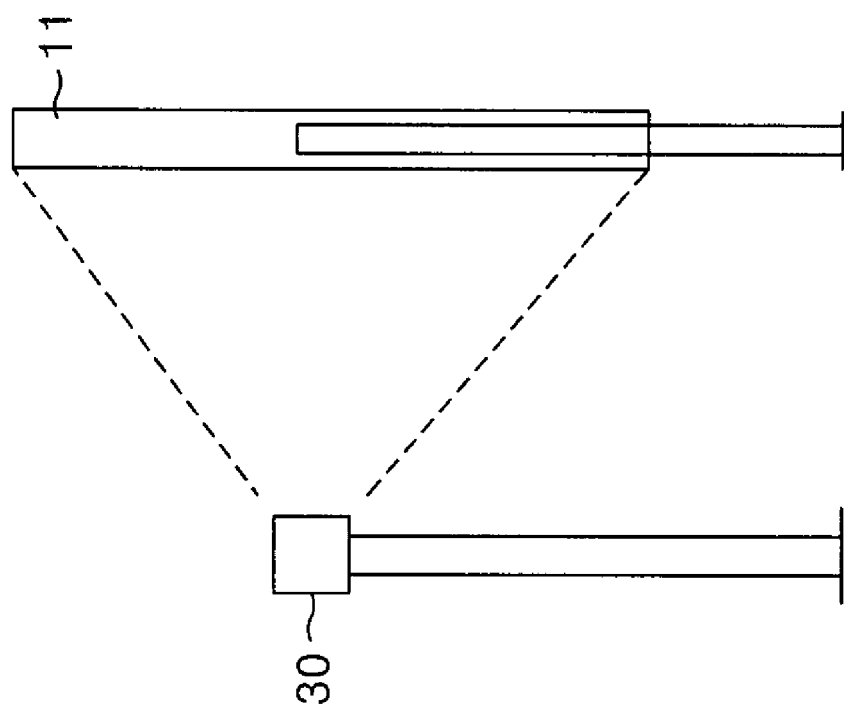
Figure 4:
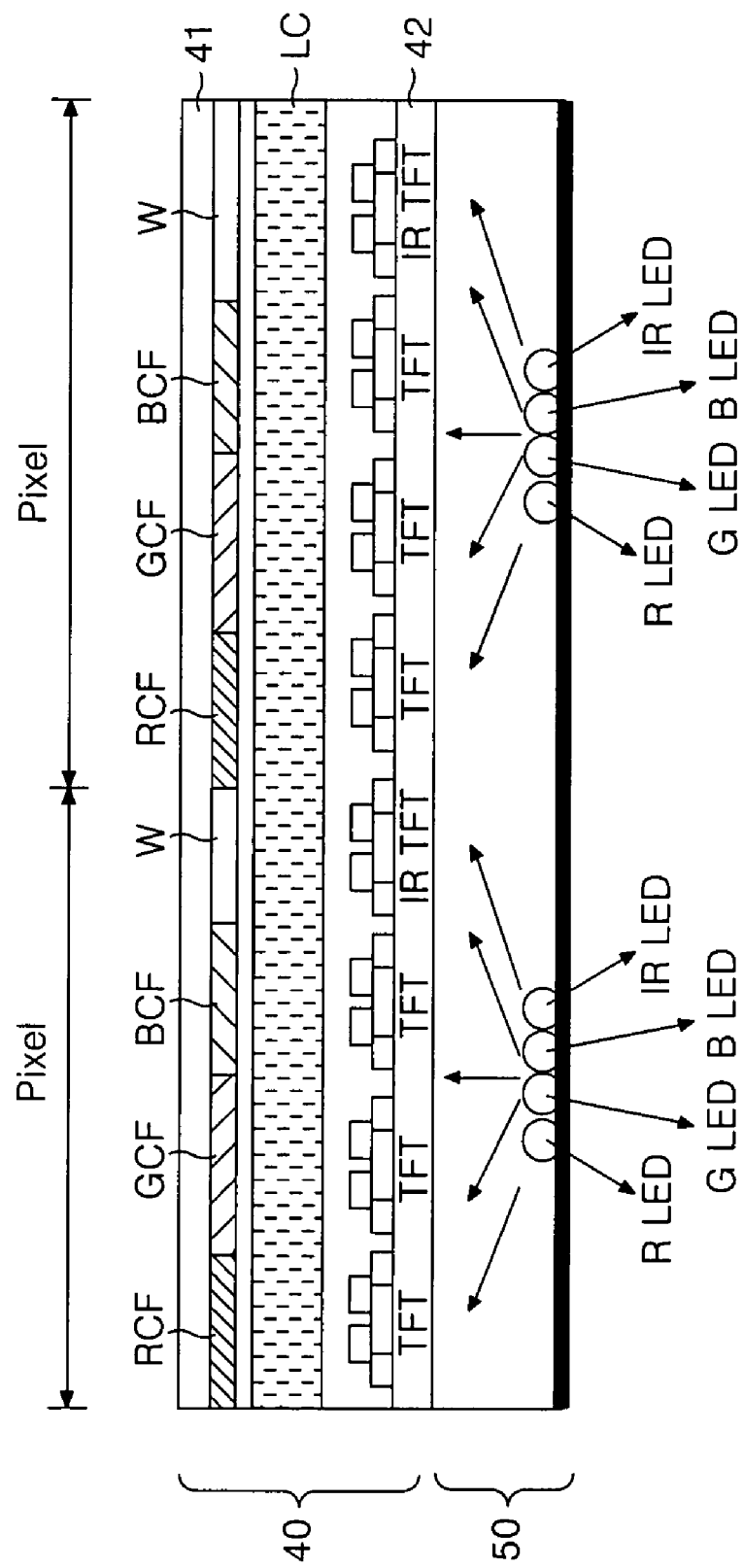
FIG. 4 is a sectional view showing a display having a multi-touch sensing function according to an embodiment.

Referring to FIG. 4, a display having a multi-touch sensing function includes a display panel 40 and a backlight unit 50 having an infrared light source. The display panel 40 includes an upper transparent substrate 41, a lower transparent substrate 42, and a liquid crystal layer LC. The upper transparent substrate 41 has color filters RCF, GCF, and BCF and a transparent window W, which are formed at the same layer. The lower transparent substrate 42 has a pixel thin film transistor (TFT) that selects a pixel, and a TFT for sensing an infrared ray (IR TFT). The liquid crystal layer LC is formed between the upper transparent substrate 41 and the lower transparent substrate 42. It is desirable that the upper/lower transparent substrates 41 and 42 are formed of a glass substrate because a plastic substrate, such as an acrylic plate, is relatively thick, has a wide diffusing angle upon touching, and is easily damaged or scratched.

Figure 9:
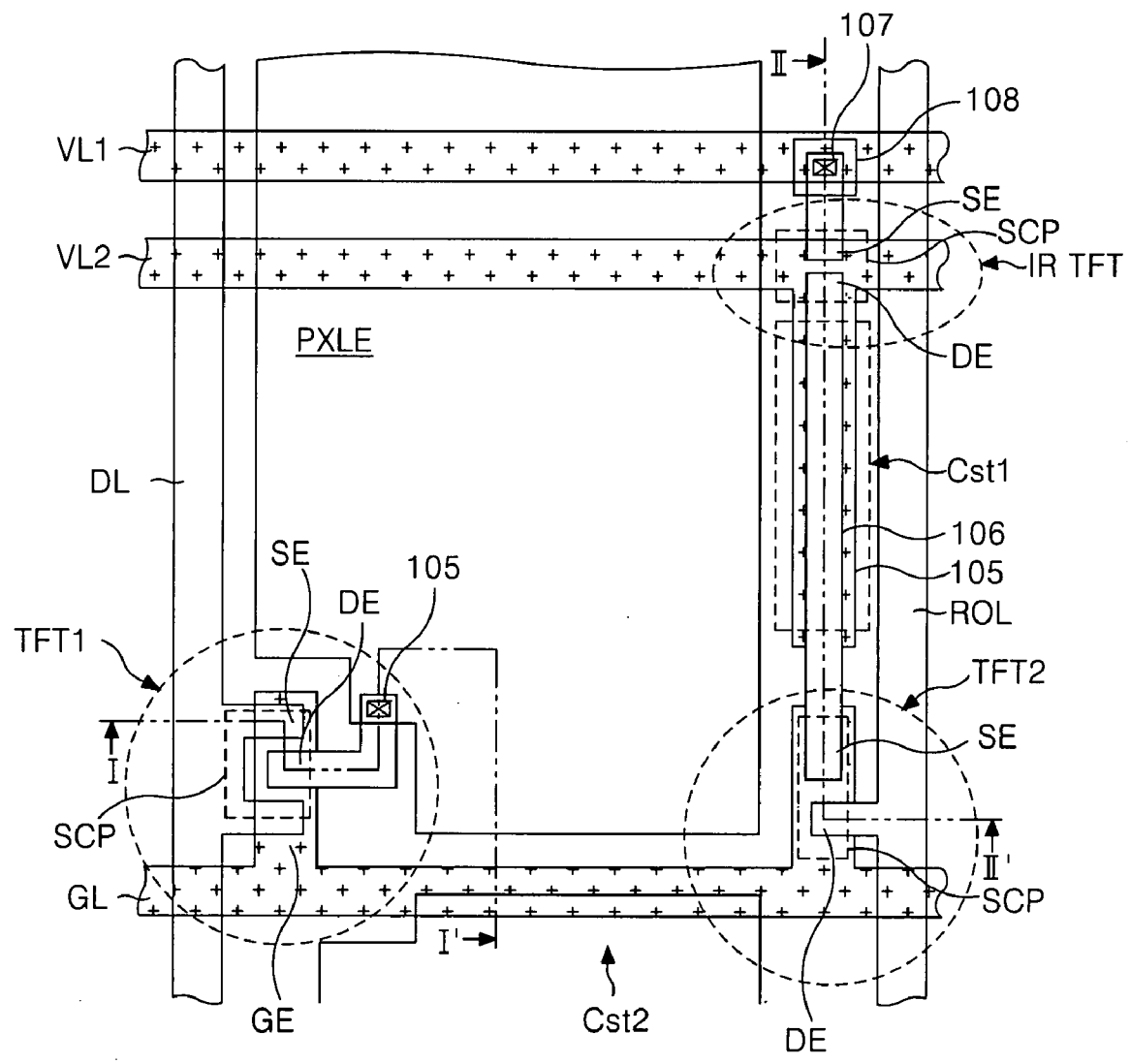
FIG. 9 is a plan view of a sub-pixel showing an IR TFT.

A plurality of data lines and a plurality of gate lines cross each other on the lower transparent substrate 42, as shown in FIG. 9. A plurality of driving voltage supply lines are parallel to the gate lines, and a plurality of read-out lines, which cross the gate lines and the driving voltage supply lines, are formed on the lower transparent substrate 42, as shown in FIG. 9. The TFTs for selecting a pixel are formed at the intersection of the data lines and the gate lines on the lower transparent substrate 42. The IR TFT are formed at the intersection of the driving voltage supply lines and the read-out lines on the lower transparent substrate 42. The pixel electrodes are formed on the lower transparent substrate 42, and are connected to the TFTs. The TFTs for selecting a pixel supply a data voltage from the data line to the pixel electrode in response to a scanning signal from the gate line.

When a finger of the user or an opaque object contacts the upper transparent substrate 41, the IR TFTs sense a portion of the infrared light reflected via the upper transparent substrate 41 and the transparent window W from the touch point. The IR TFTs output the infrared light sensing signal via the read-out line. It is not necessary to have an IR TFT for each pixel. Thus, there may be only one IR TFT for each N number of pixels, where the number N is a selected design parameter. The number of pixels between each of the IR TFTs may be adjusted.

Operation of the IR TFTs will be described in detail as follows. The color filters RCF, GCF, and BCF and the transparent window W are formed on the upper transparent substrate 41. A black matrix, which overlaps the TFTs and a border between pixels, is formed on the upper transparent substrate 41. A common electrode is formed on the upper transparent substrate 41, and is disposed opposite a pixel electrode with the liquid crystal layer LC therebetween. The common electrode is supplied with a common voltage according to a vertical electric field application, such as a Twisted Nematic (TN) mode or a Vertical Alignment (VA) mode. The common electrode may be formed on the lower transparent substrate 42 according to a horizontal electric field application method, such as an In-Plane Switching IPS mode and a Fringe Field Switching FFS mode.

A polarizer that selects a linear polarization, and an alignment film that determines a pre-tilt of a liquid crystal molecule, are formed at each of the upper/lower transparent substrates 41 and 42 of the display panel. The backlight unit 50 includes a red light source RLED, a green light source GLED, a blue light source BLED, and an infrared light source IRLED. The light sources are provided by LEDs. Furthermore, the backlight unit 50 includes optical components, such as a diffusion plate, at least one diffusion sheet, and at least one prism sheet. The optical components are located between the lower transparent substrate 42 and the light sources RLED, GLED, BLED, and IRLED. A reflecting material may be located on each of the red light source, the green light source, and the blue light source RLED, GLED, and BLED. Red light, green light, and blue light are reflected due to the reflecting material. The red light, the green light, and the blue light mix to form white light within an air space between the light sources and the lower transparent substrate 42. The white light radiates toward the display panel 40.

The infrared light source IRLED radiates infrared light to the lower glass substrate 42 through the air space. It is not necessary to include an infrared light source IRLED for each pixel. There may be only one infrared light source IRLED for each N pixels, where the number N is a selected design parameter. An intensity of the infrared light source IRLED is adjusted so that the infrared light may be reflected from a non-transmitting object, for example, a finger, tool, or other instrument, which is in contact with the upper transparent substrate 41.

Figure 5:
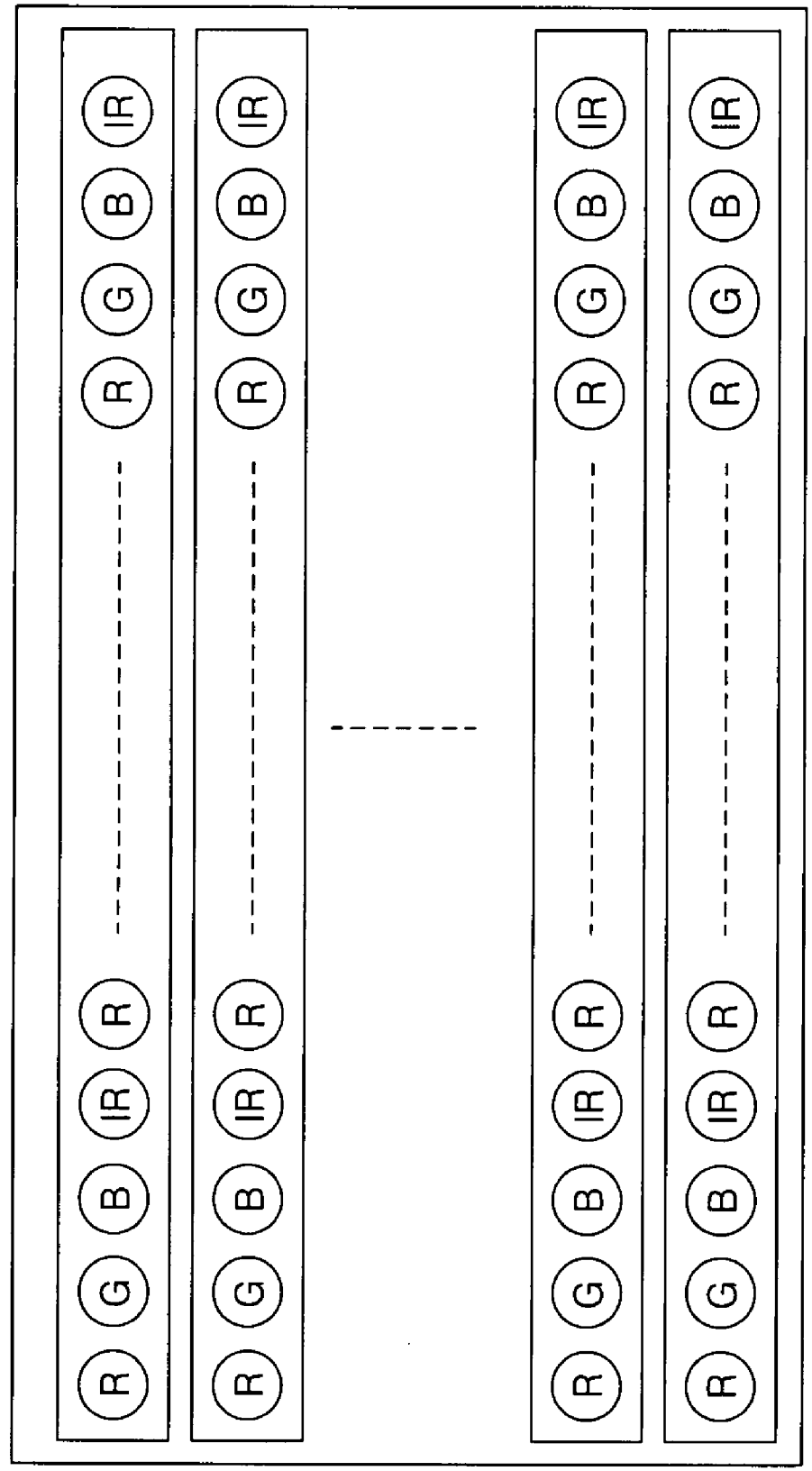
FIG. 5 to FIG. 7 are plan views showing an example of a light source arrangement of the backlight unit in FIG. 4.
Figure 6:
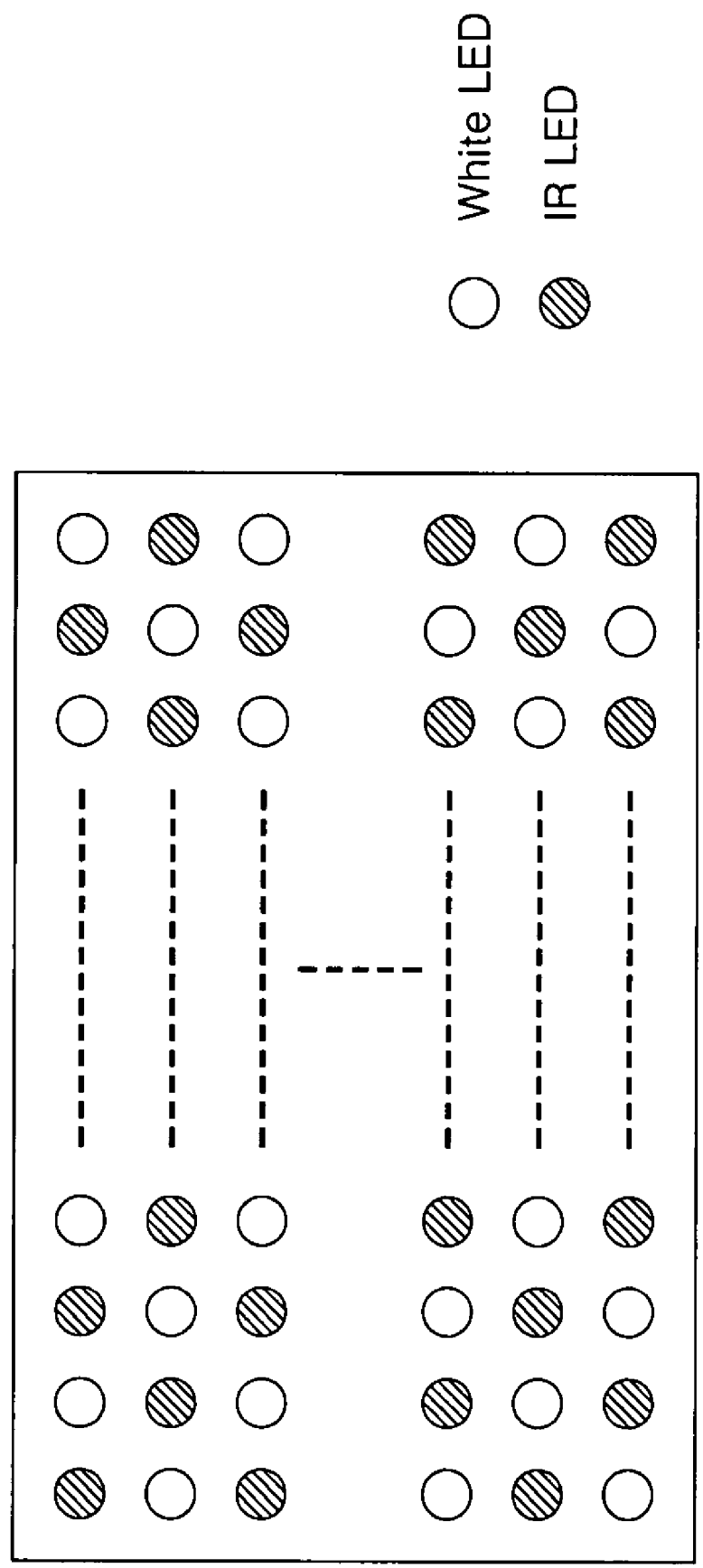
Figure 7:
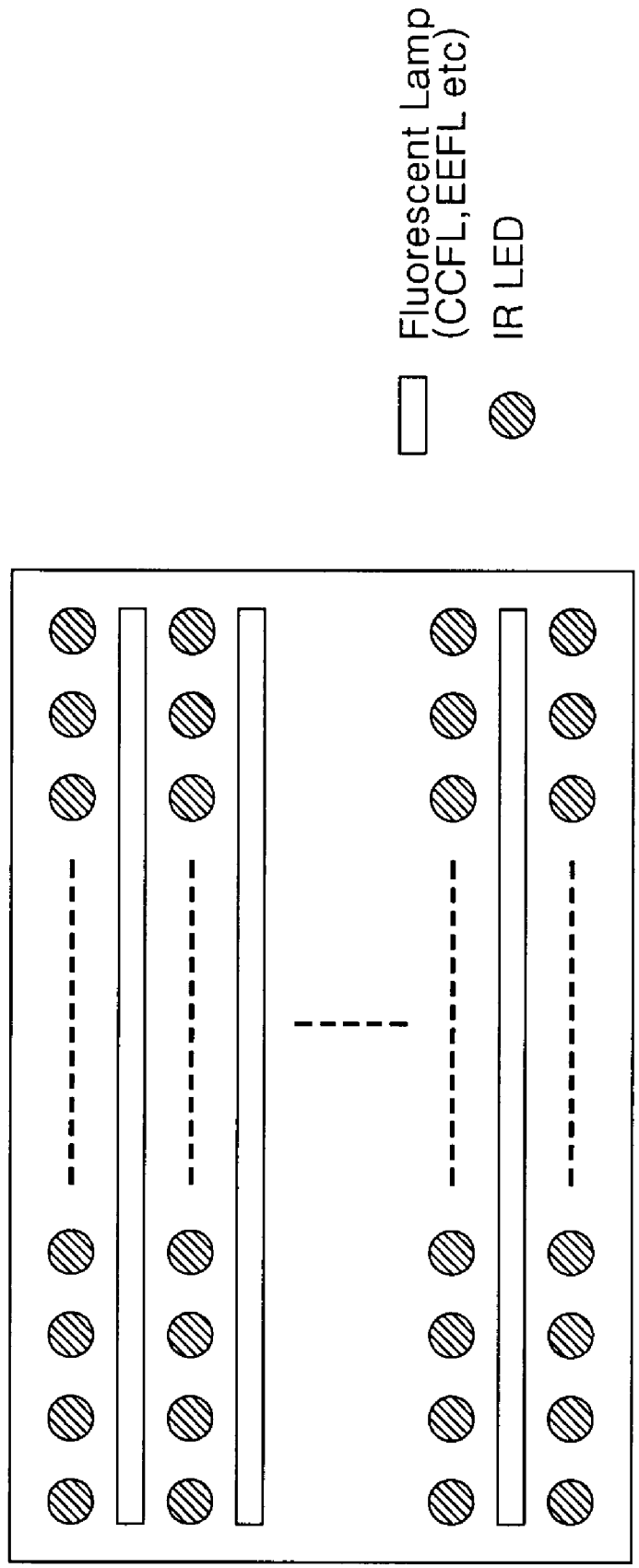

The reflected infrared light may be received by the IR TFT. In other words, an intensity of the infrared light source IRLED is adjusted to be reflected within about twelve millimeters that defines a thickness of a liquid crystal module including the display panel 40 and the backlight unit 50. The light sources RLED, GLED, BLED, and IRLED may be arranged in a plurality of rows as a repeating sequence of a red light, a green lights, a blue light and an IR light, as shown in FIG. 5. An arrangement interval and the number of the infrared light sources IR LED may be adjusted in accordance with a receiving characteristics of the infrared components. Further, the light sources of the backlight unit 50 may be include white LEDs and IRLEDs, or a plurality of fluorescent lamps and IRLEDs in a hybrid configuration, as shown in FIGS. 6 and 7.

Figure 8:
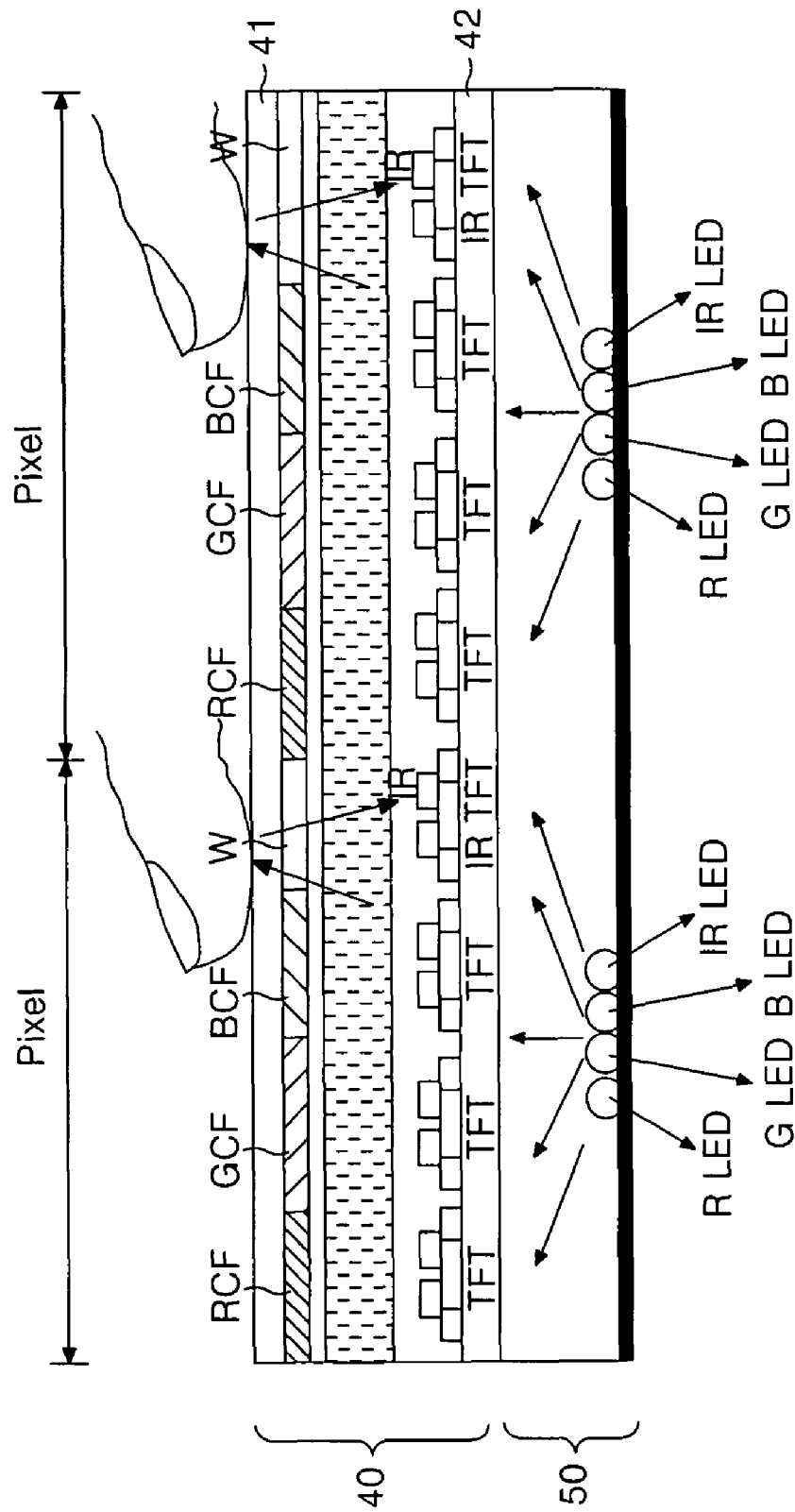
FIG. 8 is a sectional view showing an operation of the display having a multi-touch sensing function in FIG. 4.

FIG. 8 shows a multi-touch operation of the liquid crystal device having a multi-touch sensing function. If a finger or a other non-transmitting object contacts the upper transparent substrate 41 when the display panel 40 is energized, infrared light is reflected from the contact surface and is received by the IR TFT. A digital signal processing circuit processes and analyzes the infrared light received by the IR TFT. As a result, a coordinate value corresponding to the touch point is calculated, and the a plurality of touch points are recognized and identified. At the same time, one or more touch images corresponding to the touch points are displayed on the display panel 40.

Figure 10:
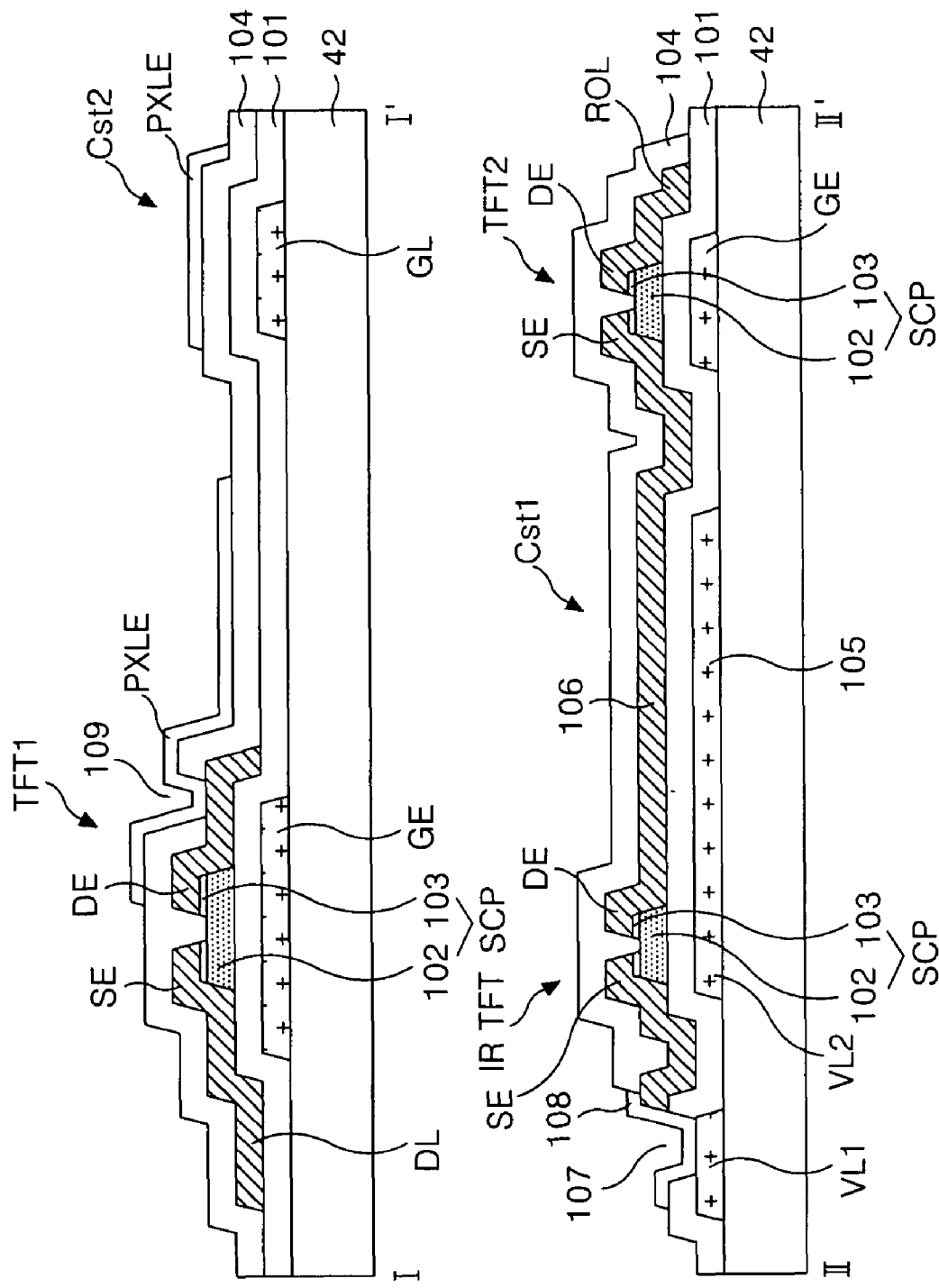
FIG. 10 is a sectional view taken along the lines I-I' and II-II' of FIG. 9.

FIG. 9 to FIG. 12 are diagrams for explaining a structure and an operation of a sub-pixel where the IR TFT is formed. Referring to FIG. 9 and FIG. 10, the lower transparent substrate 42 of the display panel 40 includes a gate line (or a scanning line) GL, a data line DL, a first TFT TFT1, a pixel electrode PXLE, a read-out line ROL, a first and second driving voltage supply lines VL1 and VL2, a IR TFT, and a second TFT TFT2. The gate line GL and the data line DL cross each other with a gate insulating film 101 therebetween. The first TFT TFT1 is formed at each intersection of the gate line GL and the data line DL. The pixel electrode PXLE is formed at a cell area defined by the intersection of the gate line GL and the data line DL. The read-out line ROL is formed parallel to the data line DL with the pixel electrode PXLE therebetween. The first and second driving voltage supply lines VL1 and VL2 are formed parallel to the gate line GL and supply first and second driving voltages. The IR TFT is formed at an intersection of the first driving voltage supply line VL1 and the second TFT TFT2. The second TFT TFT2 is formed at an intersection of the gate line GL and the read-out line ROL.

The lower transparent substrate 42 of the display panel 40 includes a first storage capacitor Cst1 and a second storage capacitor Cst2. The first storage capacitor Cst1 is electrically connected to the second driving voltage supply line VL2 between the IR TFT and the second TFT TFT2. The second storage capacitor Cst2 is formed at an overlapping area of the pixel electrode PXLE and the pre-stage gate line GL.

The first TFT TFT1 includes a gate electrode GE, a source electrode SE, a drain electrode DE, and an active layer 102. The gate electrode GE is connected to the gate line GL. The source electrode SE is connected to the data line DL. The drain electrode DE is connected to the pixel electrode PXLE. The active layer 102 is overlapped with the gate electrode GE and forms a channel between the source electrode SE and the drain electrode DE. The active layer 102 is overlapped with the data line DL, the source electrode SE, and the drain electrode DE.

An ohmic contact layer 103, which makes an ohmic contact with the source electrode SE and the drain electrode DE, is formed on the active layer 102. The active layer 102 is formed from amorphous silicon A-Si:H or a polysilicon. Such an active layer 102 and an ohmic contact layer 103 are patterned as a semiconductor pattern SCP.

The first TFT TFT1 is turned-on by a high voltage of a gate signal (or a scanning signal) from the gate line GL and provides a data voltage from the data line DL to the pixel electrode PXLE. A gate high-voltage is a voltage greater than a threshold voltage of the first TFT TFT1. Conversely, a low logical voltage of a gate signal is a voltage less than a threshold voltage of the first TFT TFT1.

The pixel electrode PXLE is a transparent electrode such as an Indium Tin Oxide ITO. The pixel electrode PXLE is connected via a first contact hole 109, which passes through a protective film 104, to the drain electrode DE of the first TFT TFT1. When a data voltage is applied to the pixel electrode, a potential difference is generated between the pixel electrode PXLE and a common electrode. The common electrode is formed at the upper transparent substrate 41 or the lower transparent substrate 42. Liquid crystal molecules are rotated due to the potential difference therebetween to change refractivity of a light, which is emitted by the backlight unit 50.

The second storage capacitor Cst2 is formed by the prestage gate line GL and the pixel electrode PXLE, which overlap each other with the gate insulating film 101 and the protective film 104 disposed therebetween. The gate insulating film 101 and the protective film 104 are located between the gate line GL and the pixel electrode PXLE. The second storage capacitor Cst2 maintains a voltage of the pixel electrode PXLE until the next data voltage charges the pixel electrode PXLE.

The IR TFT is a TFT that produces a channel current between its a source electrode and drain electrode when irradiated by infrared light. The IR TFT includes the gate electrode GE, the active layer 102, the source electrode SE, and a drain electrode DE. The gate electrode GE of the IR TFT is integral with the second driving voltage supply line VL2. The active layer 102 overlaps the gate electrode GE with the gate insulating film 101 therebetween. The source electrode SE of the IR TFT is connected to the first driving voltage supply line VL1 on the active layer 102. The drain electrode DE of the IR TFT is opposite the source electrode SE on the active layer 102.

The active layer 102 is formed amorphous silicon or polysilicon, which is doped with germanium. The IR TFT produces a photo current through the active layer 102 when illuminated by infrared light. The ohmic contact layer 103 of the IR TFT, which makes an ohmic contact with the source electrode SE and the drain electrode DE, is formed on the active layer 102. A source electrode of the IR TFT is electrically connected via a second contact hole 107, which passes through the protective film 104 and the gate insulating film 101 to expose a part of the first driving voltage supply line VL1, and a transparent electrode pattern 108, which is formed at the second contact hole 107, to the first driving voltage supplying line.

The drain electrode DE of the IR TFT, an upper electrode 106 of the first storage capacitor Cst1, and the source electrode SE of the second TFT TFT2 are integrated with each other from the same metal to be electrically connected to each other. The IR TFT senses infrared light that is reflected from a finger or an opaque object.

The first storage capacitor Cst1 includes a first storage lower electrode 105 and a first storage upper electrode 106. The first storage lower electrode 105 is integral with the gate electrode GE of the IR TFT. The first storage upper electrode 106 is overlapped with the first storage lower electrode 105 with the gate insulating film 101 therebetween, and is connected to the drain electrode DE of the IR TFT. The first storage capacitor Cst1 stores an electric charge by a photo current which is generated from the IR TFT.

The second TFT TFT2 includes the gate electrode GE, the source electrode SE, the drain electrode DE, and the active layer 102. The gate electrode GE is formed on the lower transparent substrate 42. The source electrode SE is connected to the first storage upper electrode 106. The drain electrode DE is opposite the source electrode SE with a channel therebetween. The active layer 102 is overlaps the gate electrode GE, which is connected to the gate line GL, and forms a channel between the source electrode SE and the drain electrode DE. The active layer 102 is formed of amorphous silicon or polysilicon.

Figure 11:
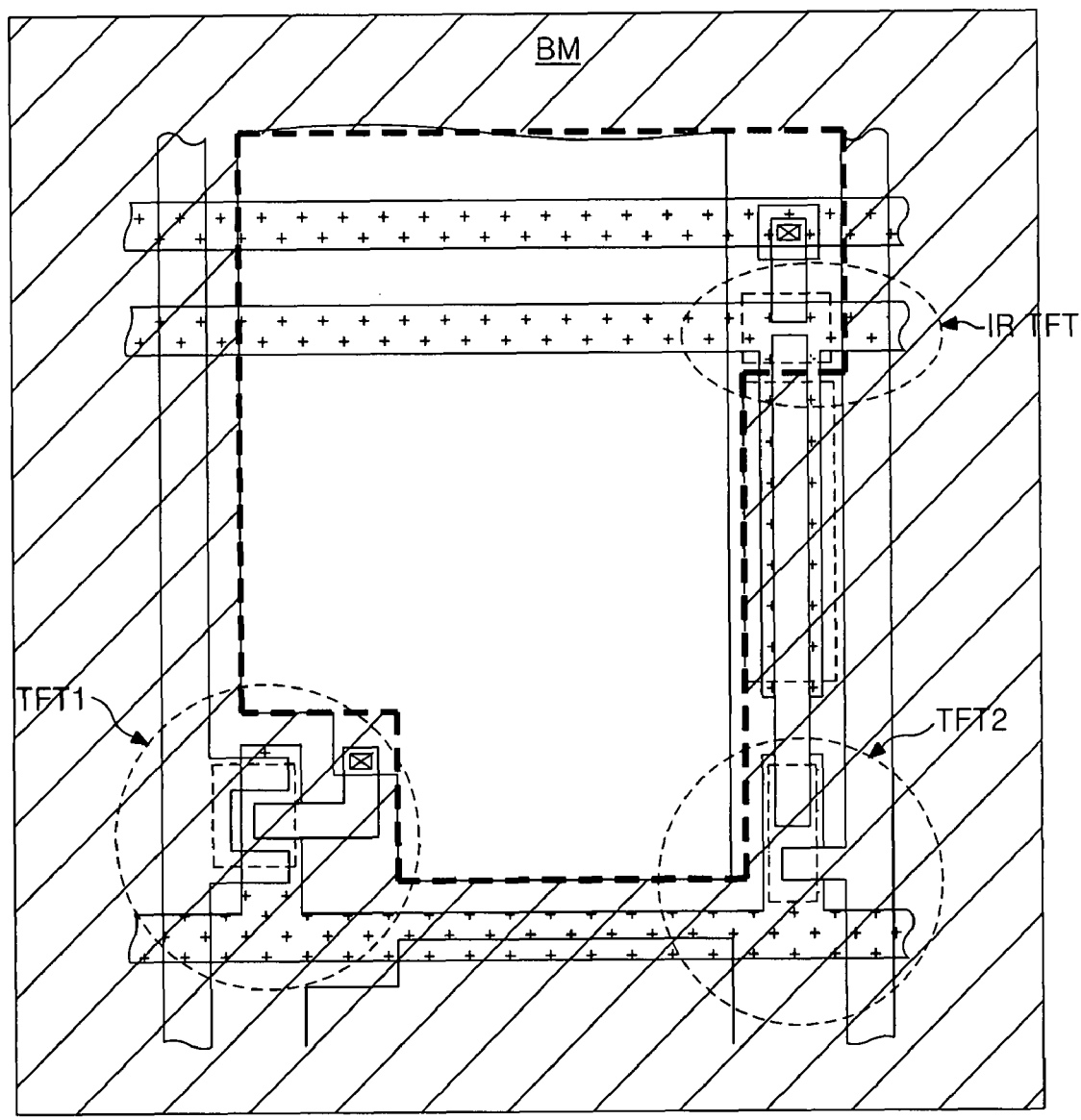
FIG. 11 is a plan view showing formation of a black matrix, and an exposed area at the sub-pixel in FIG. 9.

The ohmic contact layer 103, which makes an ohmic contact with the source electrode SE and the drain electrode DE, is formed on the active layer 102. A second TFT TFT2 is turned-on by a gate high voltage from the gate line GL to supply an electric charge, which charges the first storage capacitor Cst, to the read-out line ROL. Areas other than the IR TFT and the pixel electrode PXLE within the pixel area are shielded by a black matrix BM, which is formed at the upper transparent substrate 41 as shown in FIG. 11. Accordingly, infrared light is received at only IR TFT.

Figure 12:
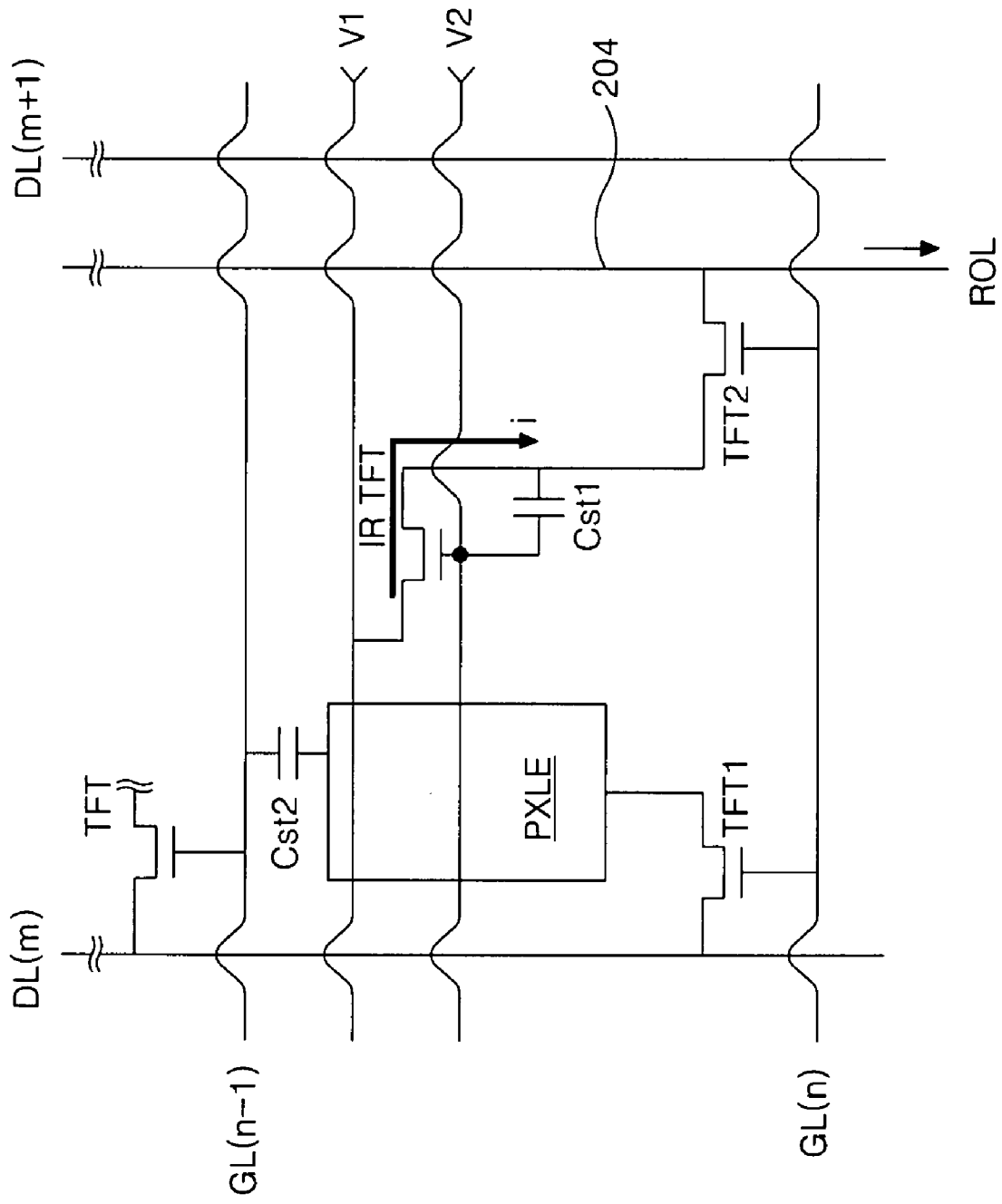
FIG. 12 is an equivalent circuit diagram of the sub-pixel in FIG. 9.

An operation of such a sub-pixel will be described in conjunction with FIG. 12. If infrared light radiates the active layer 102 of the IR TFT when a first driving voltage V1 of about 10V is applied to the source electrode SE of the IR TFT from the first driving voltage supply line VL1, and a second driving voltage V2 of about 0V to 10V is applied to the gate electrode of the IR TFT 140 from the second driving voltage supply line VL2, then a photo current "i" flows from the source electrode SE to the drain electrode via the active layer 102 in accordance with an intensity of the infrared light. The photo current i flows from the drain electrode DE to the first storage upper electrode 106 and because first storage lower electrode 105 is connected to the gate electrode GE of the IR TFT, the photo current charges the first storage capacitor Cst1. A maximum charge of the first storage capacitor Cst1 corresponds to a voltage difference between the source electrode SE and the gate electrode GE.

If a gate high voltage is supplied to the gate electrode GE of the second TFT TFT2 when the IR TFT senses visible light and the first storage capacitor Cst1 charges, the second TFT TFT2 is turned-on and the electric charge, which charged the first storage capacitor Cst1, is supplied to a read-out integrated circuit (not shown) via the combination of the source electrode SE of the second TFT TFT2, a channel of the active layer 102, the drain electrode DE, and the read-out line ROL.

Figure 13:
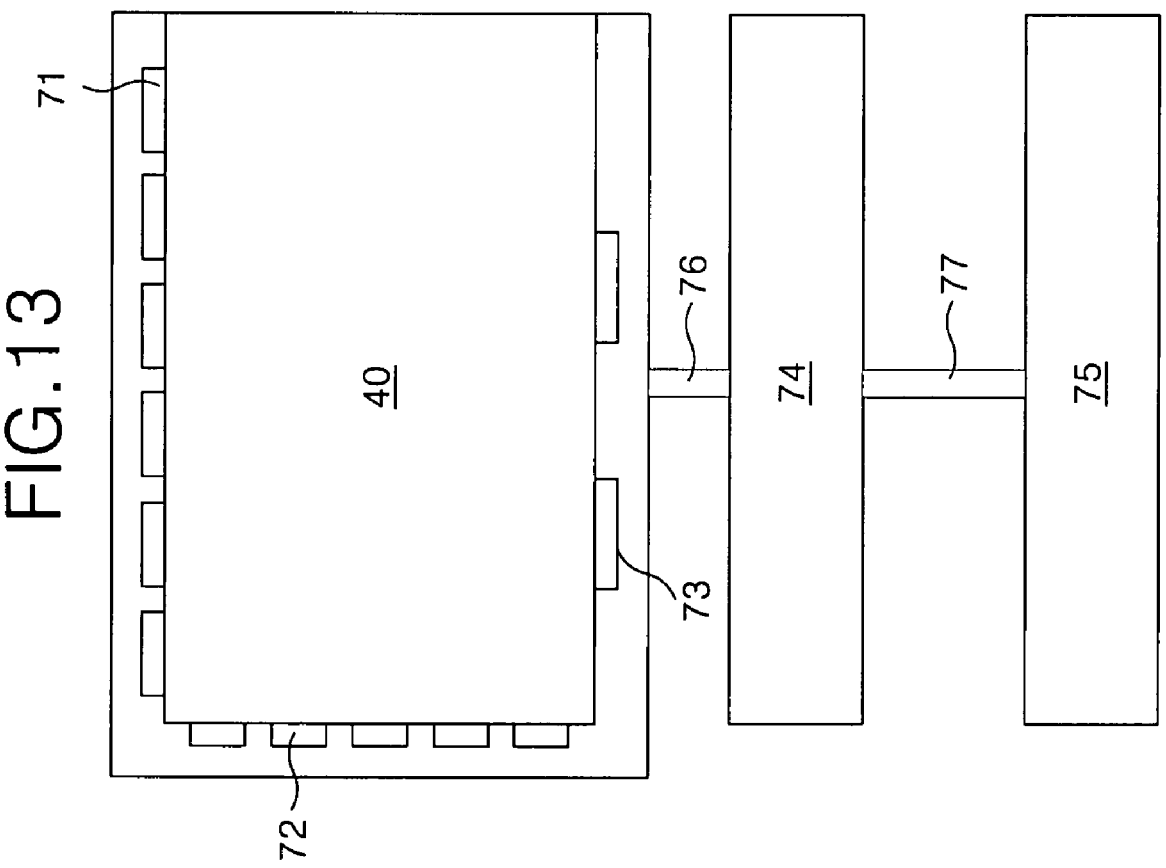
FIG. 13 is a block diagram showing the display having a multi-touch sensing function and a driving circuit.

FIG. 13 shows the display according to an embodiment. The display includes a data integrated circuit 71, a gate integrated circuit 72, a read-out integrated circuit 73, a digital board 74, and a system circuit board 75. The data integrated circuit 71 is connected to the data line DL of the display panel 40 to supply a data voltage to the data lines DL.

The gate integrated circuit 72 is connected to the gate lines G1-Gn of the display panel 40 to sequentially supply a gate pulse or a scanning pulse to the gate lines G1-Gn. The read-out integrated circuit 73 is connected to the read-out lines ROL of the display panel 40 to amplify an electric charge from the read-out lines ROL to produce a voltage signal. The digital board 74 controls the integrated circuits 71, 72, and 73. The system circuit board 75 is connected to the digital board 74.

The data integrated circuit 71 converts digital video data, which is inputted from a timing controller, into analog data voltages. The analog data voltages are supplied to the data lines DL of the display panel 40 in response to a timing control signal, which is applied by the timing controller. Analog data voltages with which the data line DL is supplied are selected from gamma compensation voltages corresponding to gray scale values of the digital video data.

The gate integrated circuit 72 generates a gate pulse to sequentially supply the gate pulse to the gate lines G1-Gn in response to a timing control signal supplied by the timing controller of the digital board 74. The read-out integrated circuit 73 includes a voltage amplifier, and converts and amplifies an electric charge into a voltage to supply the digital board 74.

The digital board 74 is connected to the integrated circuits 71, 72, and 73 via a cable 76 and an interface circuit, and includes the timing controller, an inverter, and a DC-DC converter. The inverter drives a light source of the backlight unit. The DC-DC converter generates driving voltages for the display panel, namely, a gamma compensation voltage, a gate high voltage, and a gate low voltage.

The digital board 74 generates a driving power and timing control signals of the integrated circuits, and supplies digital video data for a background image and digital video data of a touch image. The background image and digital video data are inputted from a digital touch image processing circuit to the data integrated circuit 71 to drive and control the integrated circuits, thereby displaying a touch images on the display panel 40.

The system circuit board 75 is connected to the digital board 74 via the cable 76 and the interface circuit, and includes a circuit that processes video signals from an external video source, such as a broadcast receiving circuit, a CD, or a DVD, etc. The digital board 74 or a system circuit board 75 further includes a digital touch image processing circuit that processes a touch image. The digital touch image processing circuit recognizes an infrared light touch sensing signal, which is inputted via an IR TFT array, as an image type instead of a coordinate. Furthermore, the digital touch image processing circuit analyzes a pattern of a touch image to detect a touch center or a center of a finger among multiple touch finger images, so as to generate touch image data to be displayed at the display panel 40.

Figure 14:
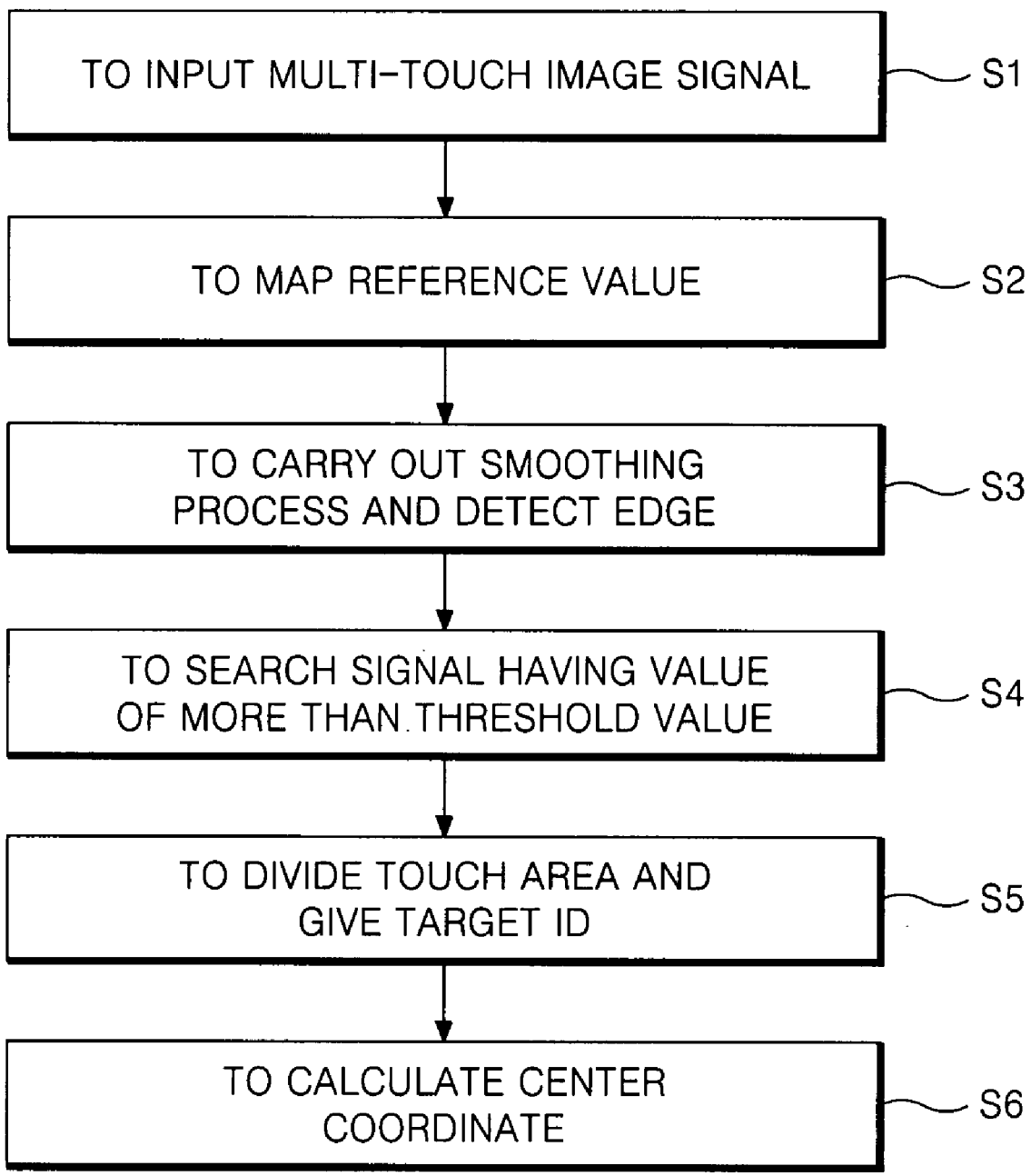
FIG. 14 is a flowchart showing processing of a touch image.

FIG. 14 is a flow chart showing an operation algorithm of the digital touch image processing circuit. Pre-set reference values for each touch area are pre-set based on a level of white noise and a deviation of the IR TFT from each of the touch areas. The reference values are stored in the digital touch image processing circuit. A threshold value, which is applied when calculating coordinates for each touch area, is stored in the digital touch image processing circuit. If a digital signal of a touch image is inputted to the digital touch image processing circuit, the digital touch image processing circuit maps reference values to an inputted digital signal to extract touch image data of more than a reference value (S1 and S2). Next, the digital touch image processing circuit smoothes the touch image data, which is extracted in S2 step, so as to link multiple touch points and detect an edge of the touch images (S3).

Next, the digital touch image processing circuit compares signals of the touch images, which are detected in the S3 step, with a threshold value to search for signals having a value greater than the threshold value (S4). Finally, the digital touch image processing circuit divides touch areas of the signals, which have a value greater than the threshold value, and provides a target identification (ID) regarding the touch areas, and then calculates a center coordinate of each touch area using a target ID of the touch areas (S5 and S6).

As described above, the display having a multi-touch sensing function includes an infrared light sensor IR TFT and the transparent window W within the display panel. The panel is arranged with the infrared light source within the backlight unit, which is located at the vicinity of the display panel. The panel is configured to be thin.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A touch-sensing display screen comprising:
    an upper transparent substrate;
    a lower transparent substrate opposite the upper transparent substrate;
    a backlight unit having an infrared light source configured to radiate infrared light through the upper transparent substrate in a first direction;
    a transparent window disposed in alignment with the infrared light source and between the upper and lower transparent substrates;
    a portion of the infrared light radiated in the first direction being reflected back through the upper transparent substrate and through the transparent window in a second direction by an object touching a surface of the upper transparent substrate;
    a pixel area on the lower transparent substrate having a pixel thin-film transistor configured to activate a pixel electrode; and
    an infrared light-sensing thin-film transistor in the pixel area configured to sense the infrared light received through the upper transparent substrate and the transparent window in the second direction, and output an infrared light-sense signal in response thereto,
    wherein the infrared light-sensing thin-film transistor has a source electrode connected with a first driving voltage supply line supplying a first voltage, a gate electrode connected with a second driving voltage supply line supplying a second voltage different from the first voltage, and a drain electrode.

2. The touch-sensing display screen of claim 1, wherein the backlight unit includes a red light source, a green light source and a blue light source.

3. The touch-sensing display screen of claim 1, further comprising a signal processing circuit in communication with the infrared light-sense signal configured to correlate the infrared light-sense signal with one or more locations on the surface of the upper transparent substrate contacted by the object.

4. The touch-sensing display screen of claim 1, further comprising a matrix of pixel areas each having a pixel thin-film transistor configured to activate a corresponding pixel electrode.

5. The touch-sensing display screen of claim 4, wherein each pixel area further comprises an infrared light-sensing thin-film transistor.

6. The touch-sensing display screen of claim 4, wherein some of the pixels areas include an infrared light-sensing thin film transistor.

7. The touch-sensing display screen of claim 6, wherein the number of infrared light-sensing thin-film transistors is less than the number of pixel thin-film transistors.

8. The touch-sensing display screen of claim 4, further comprising a second thin-film transistor in communication with the infrared light-sensing thin-film transistor.

9. The touch-sensing display screen of claim 8, wherein the second thin-film transistor facilitates outputting the infrared light-sense signal.

10. The touch-sensing display screen of claim 9, further comprising a gate line connected to the respective pixel thin-film transistor and to the respective infrared light-sensing thin-film transistor to facilitate identification of pixel locations where the infrared light-sensing thin-film transistors received the infrared light.

11. The touch-sensing display screen of claim 10, further comprising a data line connected to the respective pixel thin-film transistor, wherein activation of both the data line and the gate line activates the corresponding pixel electrode.

12. The touch-sensing display screen of claim 11, further comprising a matrix of pixel areas, each pixel area having a pixel thin-film transistor, and some of the pixel areas having an infrared light-sensing thin-film transistor, wherein identification of the gate and data lines that activate a selected pixel thin-film transistor facilitates identification of a corresponding active infrared light-sensing thin-film transistor.

13. The touch-sensing display screen of claim 12, further comprising an image processing circuit configured analyze locations of a plurality of active infrared light-sensing thin-film transistors based on the gate and data lines of corresponding pixel thin-film transistors to detect one or more centers of touch.

14. The touch-sensing display screen of claim 13, wherein the image processing circuit is configured to identify a boundary associated with the centers of touch.

15. A display having a multi-touch sensing function, comprising:
a display panel including a transparent window which transmits an infrared light, which is reflected from an opaque object, and a plurality of infrared ray sensors which sense the infrared light, which is incident via the transparent window; and
a backlight unit radiating the infrared light to the display panel,
wherein the display panel includes:
a first transparent substrate where the transparent window is formed;
a second transparent substrate where the infrared ray sensors are formed; and
a liquid crystal layer which is formed between the first transparent substrate and the second transparent substrate, and
wherein the second transparent substrate includes:
a plurality of data lines to which a data voltage is supplied;
a plurality of gate lines which are arranged to cross the data lines and to be sequentially supplied with a scanning pulse;
a plurality of read-out lines arranged parallel to the data lines and configured to output an infrared ray sensing signal corresponding to the infrared light, which is reflected from the opaque object;
a pixel electrode formed at a pixel area, the pixel area defined by the data line, the gate line, and the read-out line;
a plurality of first thin film transistors formed at a crossing part of the gate lines to supply the data voltage to the pixel electrode in response to the scanning pulse;
a plurality of first driving voltage supplying lines arranged parallel to the gate lines to supply a high-level driving voltage to a source electrode of the infrared ray sensor;
a plurality of second driving voltage supplying lines arranged parallel to the gate lines and the first driving voltage lines, to supply a low-level driving voltage to a gate electrode of the infrared ray sensor.

16. The display having a multi-touch sensing function according to claim 15, wherein the second transparent substrate further includes:
a first storage capacitor that charges based on an electric charge from the infrared ray sensor;
a second storage capacitor formed between the pixel electrode and the gate line to maintain a voltage of the pixel electrode; and
a plurality of second thin film transistors formed at a crossing part of the gate lines and the read-out lines, and are connected to the first storage capacitor to supply an electric charge from a first storage capacitor to the read-out lines in response to the scanning pulse, and
wherein the infrared ray sensor is an infrared ray sensing thin film transistor driven by the high-level driving voltage and the low-level driving voltage to flow current by the infrared light.

17. The display having a multi-touch sensing function according to claim 16, wherein the infrared ray sensor includes:
a gate electrode integrally formed with the second driving voltage supplying line;
a semiconductor layer overlapping the gate electrode with an insulating film therebetween;
a source electrode connected to the first driving voltage supplying line on the semiconductor layer; and
a drain electrode opposite the source electrode on the semiconductor layer.

18. The display having a multi-touch sensing function according to claim 16, wherein the first transparent substrate further includes:
red, green, and blue color filters formed at a same layer as the transparent window; and
a black matrix formed at a border between the pixel areas and at an area corresponding to the first and second thin film transistors to shield an infrared light which is incident into the first and second thin film transistors.

19. The display having a multi-touch sensing function according to claim 16, wherein the liquid crystal display further includes:
a plurality of data integrated circuits connected to the data lines to convert a touch image generated by a physical contact on the display panel, the data integrated circuits configured to convert digital video data of the touch image into the data voltage;
a plurality of gate integrated circuits connected to the gate lines to sequentially supply the scanning pulse to the gate lines;
a read-out integrated circuit connected to the read-out lines to amplify an electric charge from the read-out lines, thereby outputting an amplified voltage;
a digital board configured to control driving timing of the integrated circuits and supply the digital video data of the touch image to the data integrated circuit; and a system circuit board in communication with the digital board, and wherein the digital board or the system circuit board includes a digital touch image processing circuit configured to analyze a pattern of the touch images to detect a center of touch images.

20. The display having a multi-touch sensing function according to claim 15, wherein the backlight unit includes:

a plurality of red light sources that generate a red light;

a plurality of green light sources that generate a green light;

a plurality of blue light sources that generate a blue light; and a plurality of infrared light sources that generate the infrared light.

21. The display having a multi-touch sensing function according to claim 15, wherein a number of the infrared light sources is less than a number of the red light sources, a number of the green light sources, and a number of the blue light sources.

* * * * *